(12) United States Patent
Ramaswamy

(10) Patent No.: US 12,225,204 B2
(45) Date of Patent: *Feb. 11, 2025

(54) METHODS, SYSTEMS, AND APPARATUSES FOR ENHANCED ADAPTIVE BITRATE SEGMENTATION

(71) Applicant: Comcast Cable Communications, LLC, Philadelphia, PA (US)

(72) Inventor: Srinath V. Ramaswamy, East Windsor, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/493,563

(22) Filed: Oct. 24, 2023

(65) Prior Publication Data
US 2024/0073427 A1 Feb. 29, 2024

Related U.S. Application Data

(63) Continuation of application No. 16/577,801, filed on Sep. 20, 2019, now Pat. No. 11,831,879.

(51) Int. Cl.
*H04N 19/146* (2014.01)
*H04N 19/105* (2014.01)
(Continued)

(52) U.S. Cl.
CPC ......... *H04N 19/146* (2014.11); *H04N 19/105* (2014.11); *H04N 19/159* (2014.11); *H04N 19/176* (2014.11); *H04N 19/184* (2014.11)

(58) Field of Classification Search
CPC .. H04N 19/105; H04N 19/146; H04N 19/159; H04N 19/184; H04N 21/2358; H04N 21/8456; H04N 21/8455
See application file for complete search history.

(56) References Cited

U.S. PATENT DOCUMENTS

2012/0042089 A1* 2/2012 Chen .................... H04L 65/756
709/231
2013/0091251 A1* 4/2013 Walker ............... H04N 21/6125
709/219
(Continued)

FOREIGN PATENT DOCUMENTS

EP 1827009 A1 8/2007
WO WO-2017024990 A1 * 2/2017 ....... H04N 21/44016

OTHER PUBLICATIONS

"Dependent Random Access Point Pictures in HEVC"—Martin Pettersson, Rickard Sjoberg, Jonatan Samuelsson; 978-1-4799-8339-1/15/$31.00 A©2015 IEEE (Year: 2015).*
(Continued)

*Primary Examiner* — Mainul Hasan
(74) *Attorney, Agent, or Firm* — BakerHostetler

(57) ABSTRACT

Systems and methods are described herein for processing video. An encoder may generate, for a sequence of video frames, a plurality of first segments and a plurality of second segments. The plurality of first segments may comprise stream access points (SAPs) of a first type that do not reset a picture reference buffer. The plurality of second segments may comprise SAPs of a second type that do reset the picture reference buffer. The encoder may send segments of the plurality of first segments to a computing device streaming video when network conditions are steady. The encoder may send a segment of the plurality of second segments following a switch, by the computing device, to a different bitrate based on a change to the network conditions. Once the computing device has decoded the segment the plurality of second segments, the encoder may send subsequent first segments at the different bitrate.

36 Claims, 12 Drawing Sheets

(51) Int. Cl.
*H04N 19/159* (2014.01)
*H04N 19/176* (2014.01)
*H04N 19/184* (2014.01)

(56) References Cited

U.S. PATENT DOCUMENTS

| | | | |
|---|---|---|---|
| 2014/0019593 A1* | 1/2014 | Reznik | H04L 65/762 709/219 |
| 2014/0019635 A1* | 1/2014 | Reznik | H04L 63/0428 709/231 |
| 2014/0143440 A1* | 5/2014 | Ramamurthy | H04N 21/23439 709/231 |
| 2014/0219346 A1* | 8/2014 | Ugur | H04N 19/58 375/240.12 |
| 2014/0281009 A1 | 9/2014 | Moorthy et al. | |
| 2015/0189332 A1 | 7/2015 | Rodriguez et al. | |
| 2015/0281746 A1 | 10/2015 | Lam | |
| 2015/0312303 A1* | 10/2015 | Krishna | H04L 65/80 709/219 |
| 2016/0119657 A1* | 4/2016 | Sun | H04N 21/2383 725/94 |
| 2016/0191931 A1* | 6/2016 | Hannuksela | H04N 19/136 375/240.12 |
| 2016/0234536 A1* | 8/2016 | Stockhammer | H04L 65/70 |
| 2018/0316740 A1* | 11/2018 | Stockhammer | H04L 65/65 |

OTHER PUBLICATIONS

"Seamless Switching of H.265/HEVC-CODED Dash Representations With Open Gop Prediction Structure" —Ye Yan, Miska M. Hannuksela, Houqiang Li; 978-1-4799-8339-1/15/$31.00 A©2015 IEEE (Year: 2015).*

"HTTP Live Streaming Bandwidth Management using Intelligent Segment Selection" —Ma et al.; IEEE Globecom 2011 proceedings (Year: 2011).*

"An Asymmetric Access Point for Solving the Unfairness Problem in WLANs" —Lopez-Aguilera et al.; IEEE Transactions on Mobile Computing, vol. 7, No. 10, Oct. 2008 (Year: 2008).*

"Optimized H.264-BASED Bitstream Switching for Wireless Video Streaming" —Stockhammer et al., 0-7803-9332-5/05/$20.00 A ©2005 IEEE (Year: 2005).*

"Seamless Switching of H.265/HEVC-CODED Dash Representations With Open GOP Prediction Structure" —Ye Yan, Miska M. Hannuksela, Houqiang Li; 2015 IEEE International Conference on Image Processing (ICIP). Date of Conference: Sep. 27-30, 2015 (Year: 2015).

Hannuksela (Nokia) M M et al: "Use cases and proposed design choices for adaptive resolution changing (ARC)", 125. MPEG Meeting; Jan. 14, 2019-Jan. 18, 2019; Marrakech; (Motion Picture Expert Group or I SO/1 EC JTC1/SC29/WG11), No. m45525 Jan. 13, 2019 (Jan. 13, 2019), XP030213561, Retrieved from the Internet: URL:http://pheni x. i nt-evry.fr/mpeg/doc_end_user/documents/ 125_Marrakech/wgll/m45525-JVET-M0259-v2-JVET-M0259.zip JVET-M0259.docx [retrieved on Jan. 13, 2019].

Sanchez Yago et al: "Shifted IDR Representations for Low Delay Live DASH Streaming Using HEVC Tiles", 2016 IEEE International Symposium on Multimedia (ISM), IEEE, Dec. 11, 2016 (Dec. 11, 2016), pp. 87-92, XP033048205,.

Thomas Stockhammer (Qualcomm): "SISSI Solution Proposal", 112. MPEG Meeting; Jun. 22, 2015-Jun. 26, 2015; Warsaw; (Motion Picture Expert Group or I SO/1 EC JTC1/SC29/WG11), No. m36598 Jun. 23, 2015 (Jun. 23, 2015), XP030064966, Retrieved from the Internet: URL:http://phenix.int-evry.fr/mpeg/doc_end_user/documents/ 112_Warsaw/wgll/m36598-v6-m36598-SISSI-Solution-2.zip m36598-SISSI-Solution-2.docx [retrieved on Jun. 23, 2015].

US Patent Application filed on Sep. 20, 2019, entitled "Methods, Systems, and Apparatuses for Enhanced Adaptive Bitrate Segmentation", U.S. Appl. No. 16/577,801.

U.S. Appl. No. 16/577,801, filed Sep. 20, 2019.

* cited by examiner

METHODS, SYSTEMS, AND APPARATUSES FOR ENHANCED ADAPTIVE BITRATE SEGMENTATION

CROSS-REFERENCE TO RELATED APPLICATIONS

This application is a continuation of U.S. application Ser. No. 16/577,801, filed Sep. 20, 2019, which is hereby incorporated by reference in its entirety.

BACKGROUND

An Adaptive Bitrate (ABR) transcoder encodes an uncompressed or compressed video input stream into multiple streams at different bitrates. When network conditions change, a client device streaming content may decide to switch from one stream to another stream in order to accommodate the changing network conditions. For example, when less network bandwidth is available, the client device may switch to a stream with a lower bitrate.

Switching from one stream to another stream occurs at stream access points (SAP) located at the start of each segment within a stream. In conventional systems, an instantaneous decoder refresh (IDR) frame is used for each SAP. IDR frames are used as SAPs because they instruct the client device's decoder to reset its picture reference buffer thereby preventing the decoder from referencing previous frames from the previous stream with a bitrate, resolution, or quality that may no longer be applicable because of the changed network conditions.

However, when network conditions are steady, the use of IDR frames throughout an ABR stream results in resetting the picture reference buffer unnecessarily whenever an IDR frame is decoded within the stream. Video quality and video compression efficiency would be improved if unnecessarily resetting the picture reference buffer could be avoided. Accordingly, there is a need for improved ABR techniques.

SUMMARY

Systems and methods are described herein for processing video. An encoder implementing the systems and methods described herein may generate, for a sequence of video frames, a plurality of first segments and a plurality of second segments. The plurality of first segments may comprise stream access points (SAPs) of a first type that do not reset a picture reference buffer. The plurality of second segments may comprise SAPs of a second type that do reset the picture reference buffer. The encoder may send first segments of the plurality of first segments to a computing device streaming video when network conditions are steady. The encoder may send a second segment of the plurality of second segments following a switch, by the computing device, to a different bitrate based on a change to the network conditions. Once the computing device has decoded the second segment, the encoder may send subsequent first segments at the different bitrate.

BRIEF DESCRIPTION OF THE DRAWINGS

The following drawings show generally, by way of example, but not by way of limitation, various examples discussed in the present disclosure. In the drawings.

DETAILED DESCRIPTION OF ILLUSTRATIVE EMBODIMENTS

Figure 1:
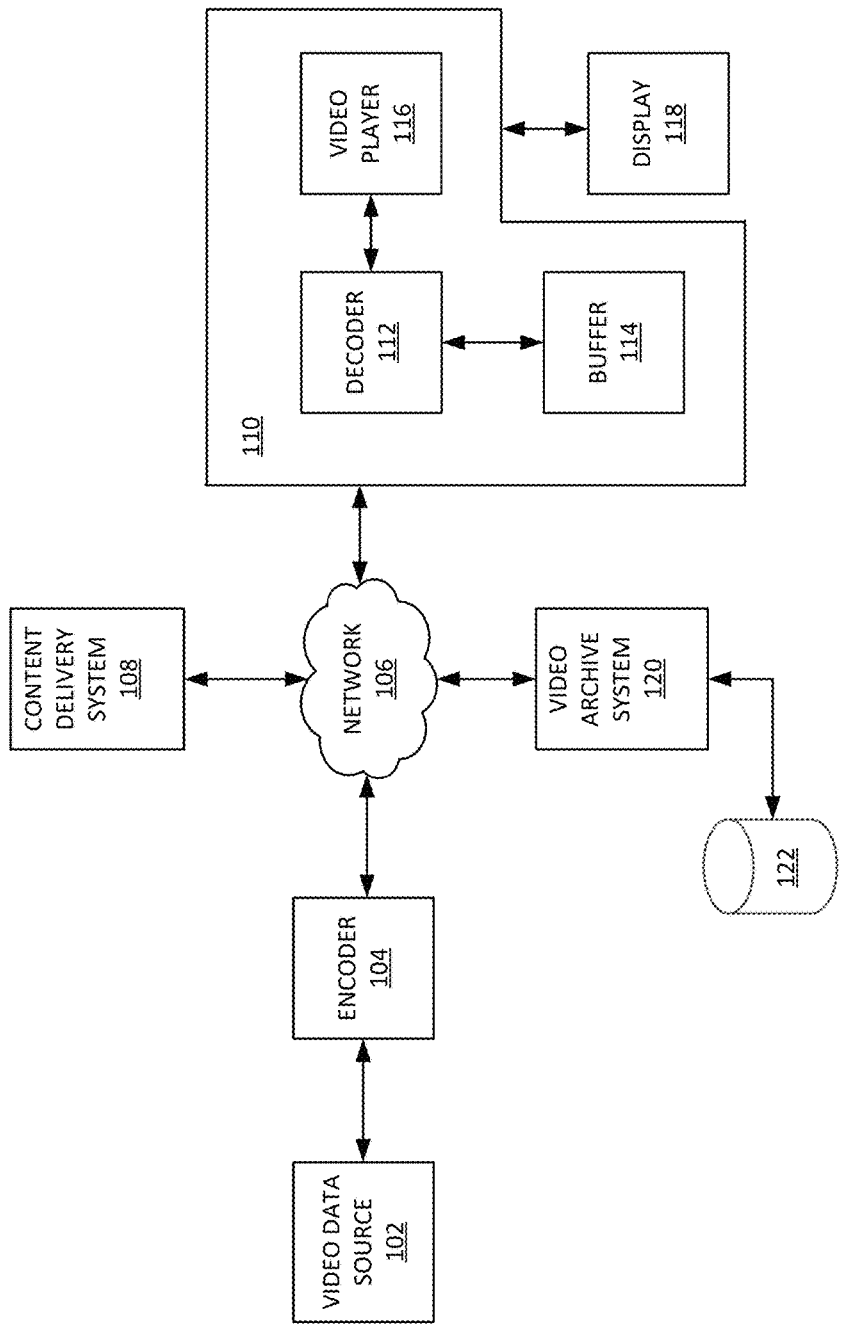
FIG. 1 shows an example system.

Systems and methods are described herein for processing video. Video content may comprise video frames or other images. Video frames may comprise pixels. A pixel may comprise a smallest controllable element of a video frame. A video frame may comprise bits for controlling each associated pixel. A portion of the bits for an associated pixel may control a luma value (e.g., light intensity) of each associated pixel. A portion of the bits for an associated pixel may control one or more chrominance value (e.g., color) of the pixel. The video may be processed by a video codec comprising an encoder and decoder. When video frames are transmitted from one location to another, the encoder may encode the video (e.g., into a compressed format) using a compression technique prior to transmission. The decoder may receive the compressed video and decode the video (e.g., into a decompressed format).

A group of pictures (GOP) may start with an intra-coded picture (I-frame), which comprises a complete image, or an instantaneous decoder refresh (IDR) frame. An IDR frame may be referred to as a refresh frame because it resets a picture reference buffer in the decoder so that subsequent frames cannot refer to any frames prior to the IDR frame. In contrast, with an I-frame, the decoder can continue to reference frame information prior to the I-frame.

Frames in a GOP may also comprise a predicted picture (P-frame), which comprises only the changes in the image from a previous frame. For example, only movement from the previous frame may be encoded in the P-frame, which saves space because unchanged pixels do not need be encoded in the P-frame.

Frames in a GOP may also comprise a bidirectional predicted picture (B-frame) comprising differences between the current frame and both a previous frame and a subsequent frame, which therefore saves space by encoding fewer pixels than a P-frame.

The embodiments described herein are directed to enhancements in Adaptive Bitrate (ABR) streaming, which as described above, is used to encode a video input stream into multiple streams at different bitrates. Each ABR stream may be referred to herein as a variant. Each variant may comprise one or more segments that each comprise a plurality of frames. The enhancements described herein cause improved video quality for an ABR system and also cause improvements in the efficiency of the video compression of the ABR segments.

The ABR segments in the embodiments described herein comprise two segments for each segment. The first of the two segments may begin with an I-frame. When network conditions are steady, and no variant switch is needed, a computing device that is streaming content may continue to request and decode ABR segments that begin with I-frames. As noted above, using I-frames enables the decoder to reference frame data from previous frames and segments. This enhancement improves the quality of the video playback because referencing frame data from previous segments causes a smoother viewing experience. Further, referencing frame data from previous frames and segments enables the system to encode less frame data or fewer frames per each segment, resulting in improved compression.

When network conditions change (e.g., changing network bandwidth, channel changes, time shifting, etc.), the computing device may request and decode an ABR segment of a new variant, and the first ABR segment of the new variant may begin with an IDR frame. Once the first segment of the new variant is decoded, the computing device may begin requesting and decoding ABR segments of the new variant that each begin with an I-frame. Requesting and decoding ABR segments beginning with an I-frame may continue until another variant switch is performed.

FIG. 1 shows a system 100 configured for video processing. The system 100 may comprise a video data source 102, an encoder 104, a content delivery system 108, a computing device 110, and a video archive system 120. The video archive system 120 may be communicatively connected to a database 122 to store archived video data.

The video data source 102, the encoder 104, the content delivery system 108, the computing device 110, the video archive system 120, and/or any other component of the system 100 may be interconnected via a network 106. The network 106 may comprise a wired network, a wireless network, or any combination thereof. The network 106 may comprise a public network, such as the Internet. The network 106 may comprise a private network, such as a content provider's distribution system. The network 106 may communicate using technologies such as WLAN technology based on the Institute of Electrical and Electronics Engineers (IEEE) 802.11 standard, wireless cellular technology, Bluetooth, coaxial cable, Ethernet, fiber optics, microwave, satellite, Public Switched Telephone Network (PTSN), Digital Subscriber Line (DSL), BPL, or any other appropriate technologies.

The video data source 102 may comprise a headend, a television or movie studio, a video camera, a video on-demand server, a cable modem termination system, the like, and/or any combination of the foregoing. The video data source 102 may provide uncompressed, raw video data comprising a sequence of frames. The video data source 102 and the encoder 104 may be incorporated as a single device and/or may be co-located at a premises. The video data source 102 may provide the uncompressed video data based on a request for the uncompressed video data, such as a request from the encoder 104, the computing device 110, the content delivery system 108, and/or the video archive system 120.

The content delivery system 108 may receive a request for video data from the computing device 110. The content delivery system 108 may authorize/authenticate the request and/or the computing device 110 from which the request originated. The request for video data may comprise a request for a linear video playing on a channel, a video on-demand asset, a website address, a video asset associated with a streaming service, the like, and/or any combination of the foregoing. The video data source 102 may transmit the requested video data to the encoder 104.

The encoder 104 may encode (e.g., compress) the video data. The encoder 104 may transmit the encoded video data to the requesting component, such as the content delivery system 108 or the computing device 110. The content delivery system 108 may transmit the requested encoded video data to the requesting computing device 110. The video archive system 120 may provide a request for encoded video data. The video archive system 120 may provide the request to the encoder 104 and/or the video data source 102. Based on the request, the encoder 104 may receive the corresponding uncompressed video data. The encoder 104 may encode the uncompressed video data to generate the requested encoded video data. The encoded video data may be provided to the video archive system 120. The video archive system 120 may store (e.g., archive) the encoded video data from the encoder 104. The encoded video data may be stored in the database 122. The stored encoded video data may be maintained for purposes of backup or archive. The stored encoded video data may be stored for later use as "source" video data, to be encoded again and provided for viewer consumption. The stored encoded video data may be provided to the content delivery system 108 based on a request from a computing device 110 for the encoded video data. The video archive system 120 may provide the requested encoded video data to the computing device 110.

The computing device 110 may comprise a decoder 112, a buffer 114, and a video player 116. The computing device 110 (e.g., the video player 116) may be communicatively connected to a display 118. The display 118 may be a separate and discrete component from the computing device 110, such as a television display connected to a set-top box. The display 118 may be integrated with the computing device 110. The decoder 112, the video player 116, the buffer 114, and the display 118 may be realized in a single device, such as a laptop or mobile device. The computing device 110 (and/or the computing device 110 paired with the display 118) may comprise a television, a monitor, a laptop, a desktop, a smart phone, a set-top box, a cable modem, a gateway, a tablet, a wearable computing device, a mobile computing device, any computing device configured to receive and/or playback video, the like, and/or any combination of the foregoing. The decoder 112 may decompress/decode the encoded video data. The encoded video data may be received from the encoder 104. The encoded video data may be received from the content delivery system 108, and/or the video archive system 120.

Figure 2:
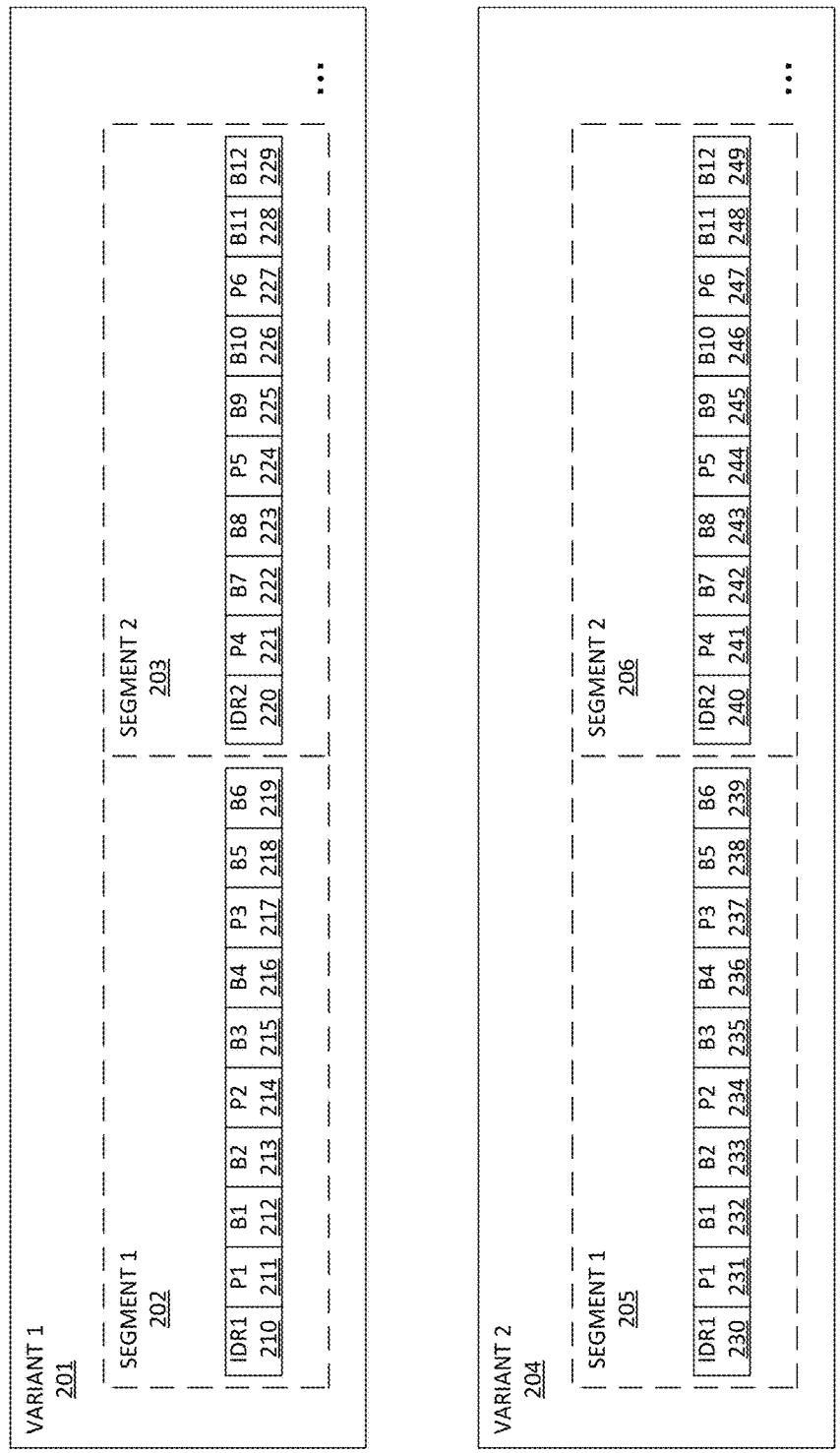
FIG. 2 shows a diagram of an example Adaptive Bitrate (ABR) transcoder output.

FIG. 2 is a diagram of an example ABR transcoder output 200. FIG. 2 shows an example group of compressed frames and the picture type output of each frame. In the example of FIG. 2, the output frames are shown in the order in which they are decoded (not displayed on a display device). The ABR transcoder output 200 comprises variant 1 201 and variant 2 204. The depiction of two variants is for exemplary purposes and more than two variants may be output by the ABR transcoder (e.g., there may three or more variants).

Each variant comprises a plurality of segments. Variant 1 201 comprises segment 1 202 and segment 2 203. Variant 2 204 comprises segment 1 205 and segment 2 206. The depiction of two segments is for exemplary purposes and more than two segments may be in a variant (e.g., there may be three or more segments). The boundary of the segments amongst the variants are aligned (e.g., the boundaries of segment 1 202 in variant 1 201 is aligned with segment 1 205 in variant 2 204), and the aligned segments comprise the same video content to be viewed by the streaming computing device (e.g., decoding segment 1 202 in variant 1 201 or segment 1 205 in variant 2 204 result in viewing the same content).

Each segment comprises a plurality of frames. Segment 1 202 in variant 1 201 comprises IDR1 frame 210, P1 frame 211, B1 frame 212, B2 frame 213, P2 frame 214, B3 frame 215, B4 frame 216, P3 frame 217, B5 frame 218, and B6 frame 219. Segment 2 203 in variant 1 201 comprises IDR2 frame 220, P4 frame 221, B7 frame 222, B8 frame 223, P5 frame 224, B9 frame 225, B10 frame 226, P6 frame 227, B11 frame 228, and B12 frame 229. IDR2 frame 220 comprises an SAP.

Segment 1 205 in variant 2 204 comprises IDR1 frame 230, P1 frame 231, B1 frame 232, B2 frame 233, P2 frame 234, B3 frame 235, B4 frame 236, P3 frame 237, B5 frame 238, and B6 frame 239. Segment 2 206 in variant 2 204 comprises IDR2 frame 240, P4 frame 241, B7 frame 242, B8 frame 243, P5 frame 244, B9 frame 245, B10 frame 246, P6 frame 247, B11 frame 248, and B12 frame 249. IDR2 frame 240 comprises a SAP. Each frame in the segments depicted in FIG. 2 are aligned (e.g., IDR2 frame 220 and IDR2 frame 240 are aligned).

The depiction of only IDR, P, and B frames within each segment of FIG. 2 is for exemplary purposes and other frames could be used following the IDR frames in each segment. For example, a larger segment may include an I-frame in the middle of the segment following the IDR frame of that segment. In another example, the segment may comprise additional P or B frames. The selection of the types of frames used in each segment is based on the encoder design and the content being viewed.

In accordance with the techniques disclosed herein, the ABR transcoder output of FIG. 2 may be modified to comprise two segments per segment listed. For example, segment 2 203 in variant 1 201 and segment 2 206 in variant 2 204 as shown in FIG. 2 may be modified such that the transcoder outputs, for each variant, a segment 2 (starting with an I-frame resulting in an open GOP) and a segment 2' (starting with an IDR frame resulting in a closed GOP).

Including closed GOP segments (e.g., segment 1', segment 2', segment 3' . . . segment x') enables seamless switching when moving from one variant to another variant during upscaling or downscaling to address changing network bandwidth, channel changes, time shifting, etc. Further, including the open GOP segments (e.g., segment 1, segment 2, segment 3 . . . segment x) enables a decoder to continue referencing frame data from previous segments when a variant switch is not necessary. As described above, this enhancement improves the quality of the video playback because referencing frame data from previous segments causes a smoother viewing experience. In an example, during a bitstream switch, a client player may be modified to retrieve the segment x' file first after the bitstream switch, decode segment x', and then return to decoding the segment x files.

Figure 3A:
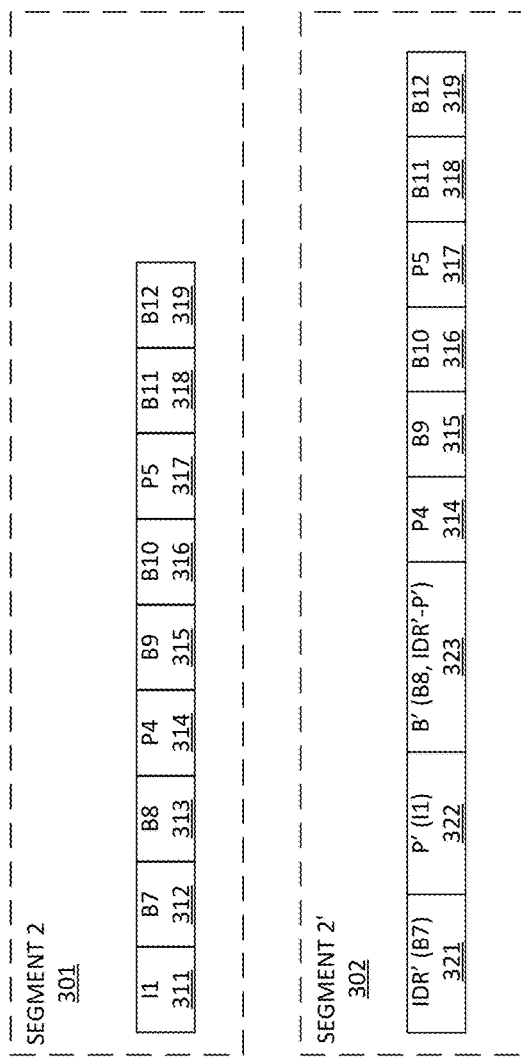
FIG. 3A is a diagram of an example ABR segment showing frames in the order that they would be decoded.
Figure 3B:
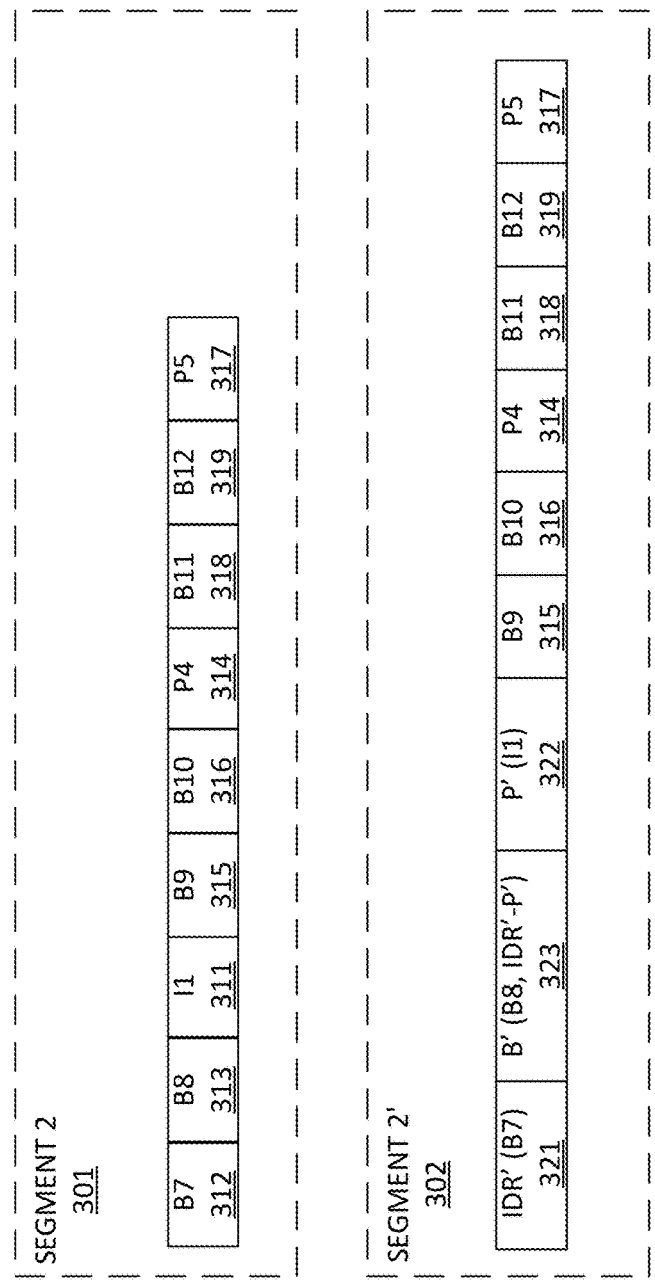
FIG. 3B is a diagram of an example ABR segment showing frames in the order that they would be presented when played back by a display device.

FIGS. 3A-3B show examples of an ABR segment 300. The enhanced ABR segment 300 comprises segment 2 301 and segment 2' 302, which each comprise the same frame data for the same variant. Segment 2 301 would be decoded by a computing device streaming content when no variant switch was necessary following decoding of the previous segment (e.g., following decoding of segment 1 in the same variant). Segment 2' 302 would be decoded by the computing device after a variant switch following decoding of the previous segment (e.g., following decoding of segment 1 in a different variant).

FIG. 3A is a diagram of an example of the enhanced ABR segment 300 showing frames in the order that they would be decoded. Referring to FIG. 3A, segment 2 301 comprises I1 frame 311, B7 frame 312, B8 frame 313, P4 frame 314, B9 frame 315, B10 frame 316, P5 frame 317, B11 frame 318, and B12 frame 319.

Segment 2' 302 comprises IDR (B7) frame 321, P' (I1) frame 322, B' (B8, IDR'-P') frame 323, P4 frame 314, B9 frame 315, B10 frame 316, P5 frame 317, B11 frame 318, and B12 frame 319. The information in the parentheses in segment 2' 302 corresponds to the frame data encoded in that frame in segment 2' 302. For example, IDR' frame 321 in segment 2' 302 is encoded as an IDR frame carrying the same frame data as B7 frame 312 from segment 2 301. P' frame 322 in segment 2' 302 is encoded as a P-frame carrying the same frame data as I1 frame 311 in segment 2 301. B' frame 323 in segment 2' 302 is encoded with the same frame data as B8 frame 313 in segment 2 301 and is encoded to use IDR' frame 321 and P' frame 322 as references for bidirectional prediction (which comprise the frame data for B7 frame 312 and I1 frame 311, respectively). The remaining frames in segment 2' 302 after B' frame 323 are the same as in segment 2 301.

As a result, segment 2 301 and segment 2' 302 each comprise the same source frame data so that the computing device has access to the same segment 2 content for both the case when a variant switch is necessary (decoding segment 2' 302 is necessary) or a variant switch was not necessary (segment 2 301 is decoded). Further, the enhanced ABR transcoder generated the additional segment (segment 2' 302) by re-encoding only the first three frames and by using the remaining six frames from segment 2 301. Accordingly, this technique, by only re-encoding three additional frames, causes an improved viewing quality experience by using I-frames at the start of each segment when no variant switch was needed, while still providing access to an additional nine-frame segment for use when switching variants.

FIG. 3B is a diagram of the example of the enhanced ABR segment showing frames in the order that they would be presented on a display device. Referring to FIG. 3B, segment 2 301 shows B7 frame 312, B8 frame 313, I1 frame 311, B9 frame 315, B10 frame 316, P4 frame 314, B11 frame 318, B12 frame 319, and P5 frame 317.

Segment 2' 302 comprises IDR (B7) frame 321, B' (B8, IDR'-P') frame 323, P' (I1) frame 322, B9 frame 315, B10 frame 316, P4 frame 314, B11 frame 318, B12 frame 319, and P5 frame 317. As described above, the source data of IDR' frame 321 is the same as that used for B7 frame 312, the source data of B' frame 323 is the same as that used for B8 frame 313, and the source data of P' frame 322 is the same as that used for I1 frame 311. As a result of this technique, the presentation orders for segment 2 301 and segment 2' 302 are the same. Accordingly, if a variant switch is necessary, the computing device receiving segment 2' 302 would display the same content as it would have if no switch was made and segment 2 301 was displayed instead.

Figure 4A:
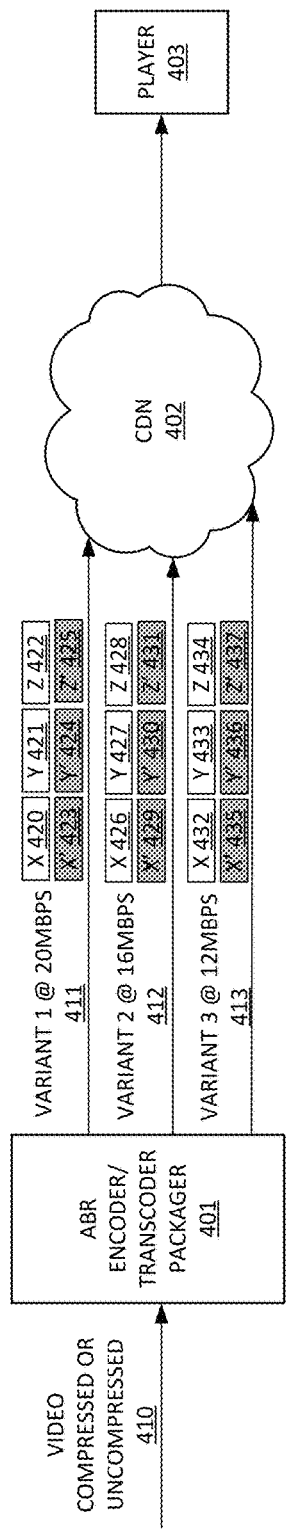
FIG. 4A shows an example system.

FIG. 4A is an example system 400. The system 400 may comprise an ABR encoder/transcoder/packager 401 implementing the techniques described herein. The ABR encoder/transcoder/packager 401 may receive video 410, which has been compressed or uncompressed. The ABR encoder/transcoder/packager 401 may generate multiple bitrate streams for each variant and transmit the multiple bitstreams to a content delivery network 402. The multiple bitrate streams may comprise variant 1 at 20 Mbps 411, variant 2 at 16 Mbps 412, and variant 3 at 12 Mbps 413.

Each variant may comprise a segment and corresponding segment'. Variant 1 at 20 Mbps 411 may comprise segment x 420, segment y 421, and segment z 422 and also corresponding segment x' 423, segment y' 424, and segment z'

425. Variant 2 at 16 Mbps 412 may comprise segment x 426, segment y 427, and segment z 428 and also corresponding segment x' 429, segment y' 430, and segment z' 431. Variant 3 at 12 Mbps 413 may comprise segment x 432, segment y 433, and segment z 434 and also corresponding segment x' 435, segment y' 436, and segment z' 437.

A computing device such as a player 403 (e.g., an HTTP Live Streaming (HLS) player or a Dynamic Adaptive Streaming over HTTP (DASH) player) may receive each variant via the CDN 402. The player 403 may be modified to retrieve the segment' when switching variants. For example, when streaming content, a computing device may receive an indication that the ABR streams comprise the enhanced ABR segments described above. For example, in an ABR system using HLS, support for signaling that a segment x' is available (e.g., segment x' 423, segment x' 429, and segment x' 435 in the example of FIG. 4A) may be accomplished by adding a custom tag in the HLS master manifest file. The custom tag may, for example, be X-SwitchSegmentPostFix. This custom tag value may be added to the file name for segment x (e.g., segment X 420 in the example of FIG. 3) to indicate that a segment x' is available. For example, if "_sw" is used as the name for the custom tag, X-SwitchSegmentPostFix, and the file name of segment x is "segmentx.ts," then the file name for segment x' may be "segmentx_sw.ts." The computing device using HLS may be configured to detect the custom tags in the segment file names and then may retrieve the segment x' files when performing a variant switch.

In another example, in an ABR system using DASH, support for signaling that a segment x' is available (e.g., segment x' 423, segment x' 429, and segment x' 435 in the example of FIG. 4A) may be accomplished by adding a custom attribute in each video (e.g., SwitchSegmentPostFix). This custom attribute may be added to the file name for segment x (e.g., segment 2 301 in the example of FIG. 3) to indicate that a segment x' is available. For example, if "_sw" is used as the name of the custom attribute, SwitchSegmentPostFix, and the file name of segment x is "segmentx.mp4," then the file name for segment x' would be "segmentx_sw.mp4." The computing device using DASH may be configured to detect the custom attributes in the segment file names and then may retrieve the segment x' files when performing a variant switch.

Figure 4B:
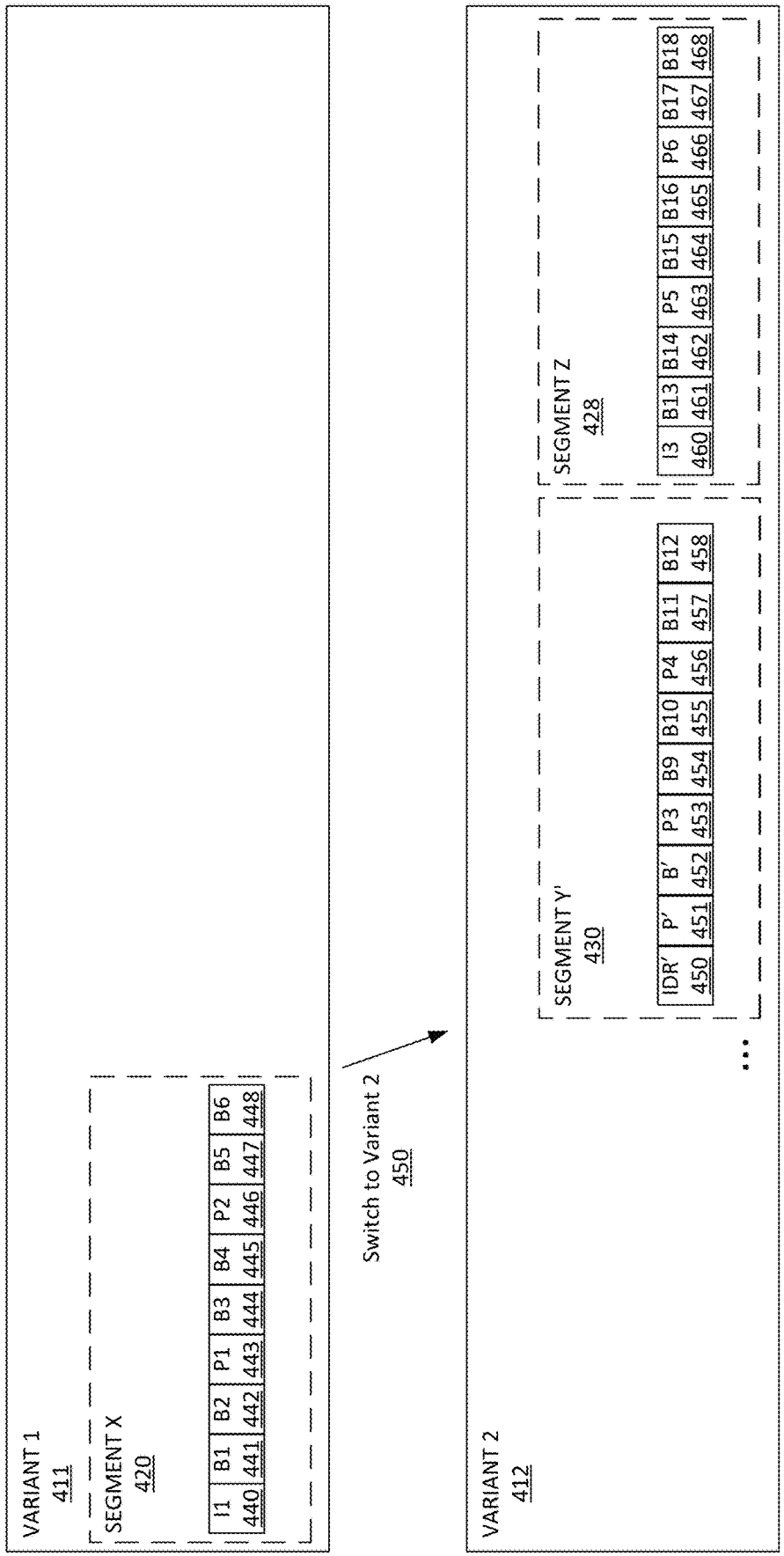
FIG. 4B shows an example transcoder output following a switch between variants.

FIG. 4B shows an example variant switch in the system of FIG. 4A 400. In this example, a computing device streaming video has decoded segment x 420 in variant 1 411. The computing device may then determine that a variant switch is desirable based on a network condition change (e.g., a change in network bandwidth, a channel change, a time shift command, etc.) and may switch 450 to variant 2 412. Because a variant switch 450 has just been performed and the previous bitrate, resolution, or quality associated with variant 1 411 no longer apply, the computing device begins decoding variant 2 412 by decoding segment y' 430, which begins with an IDR' frame 450 resulting in resetting the picture reference buffer and decoding subsequent frames with new bitrate, resolution, or quality values. If after decoding segment y'430, another variant switch is not needed, the computing device would decode segment z 428, which begins with an I-frame (e.g., I3 frame 460) allowing the decoder to reference frame data from the previous segment (e.g., segment y' 430) and resulting in a higher quality viewing experience as frames in variant 2 412 are decoded.

Figure 5:
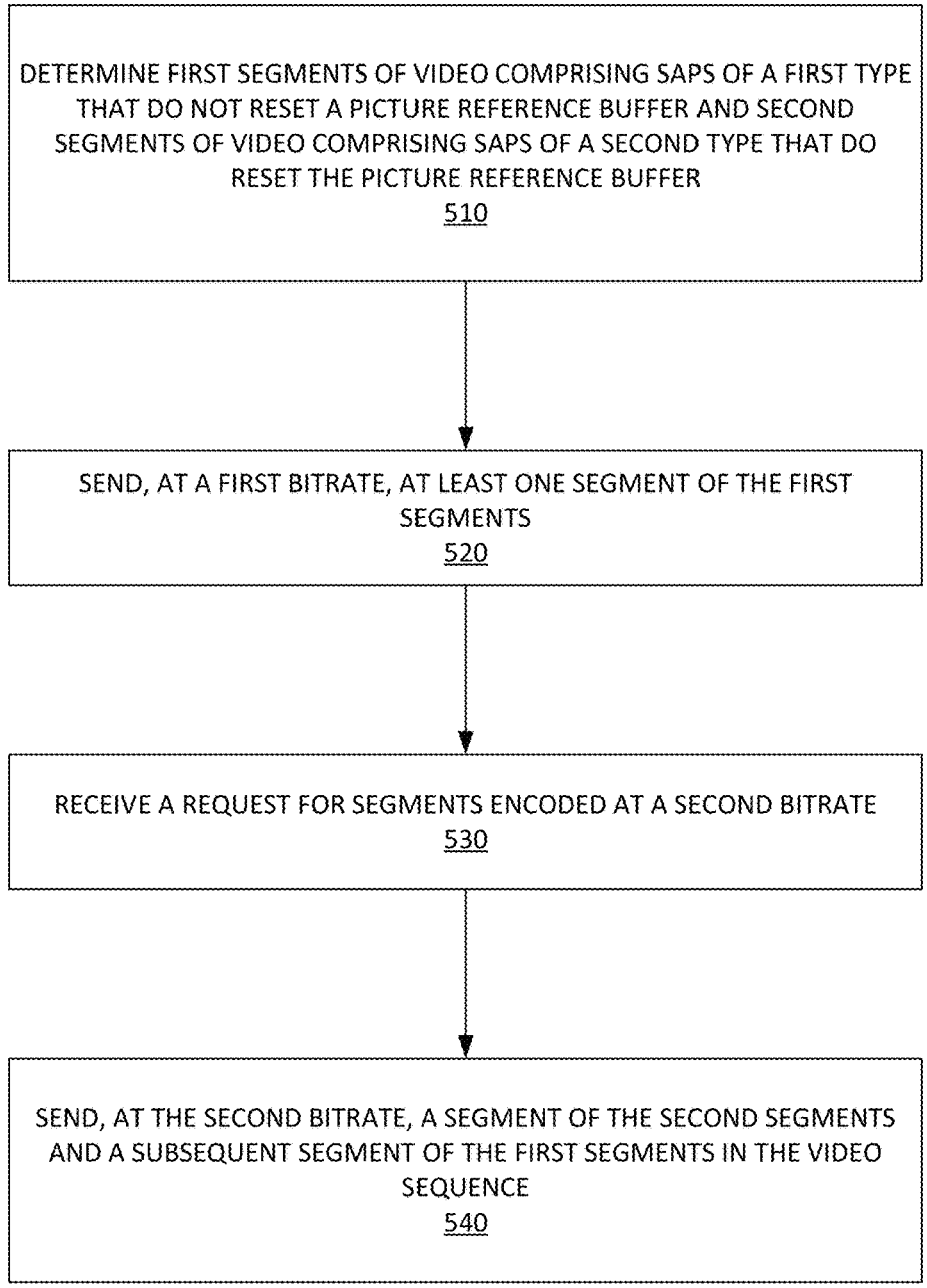
FIG. 5 shows an example method.

FIG. 5 shows an example method 500. The method 500 of FIG. 5, may be performed by the encoder 104 or computing device 110 of FIG. 1. The method 500 of FIG. 5, may be performed by the ABR encoder/transcoder packager 401 of FIG. 4. While each step in the method 500 of FIG. 5 is shown and described separately, multiple steps may be executed in a different order than what is shown, in parallel with each other, or concurrently with each other.

At step 510, the encoder may determine, for a sequence of video frames, a plurality of first segments and a plurality of second segments, wherein the plurality of first segments comprise SAPs of a first type that do not reset a picture reference buffer, and wherein the plurality of second segments comprise SAPs of a second type that do reset the picture reference buffer. The first type may comprise an I-frame, and the second type may comprise an IDR frame as shown in the examples of FIGS. 3-4.

Each segment of the plurality of first segments may comprise an I-frame, one or more P-frames, and one or more B-frames as shown in the examples of FIGS. 3-4. Each segment of the plurality of second segments may comprise a subset of those frames but still comprise source frame data that matches source frame data in a first segment of the plurality of first segments so that the computing device streaming the content may view the same content whether decoding a first segment or its corresponding second segment.

At step 520, the encoder may send, at a first bitrate, to a computing device, at least one segment of the plurality of first segments. At step 530, the encoder may receive, from the computing device, a request for segments encoded at a second bitrate. The request may be based on at least one of: changing network bandwidth, a channel change by the computing device, or a time shifting command by the computing device. The request may be enabled by detection by the computing device of an indication in the bitstream that a stream at another bitrate is available. At step 540, the encoder may send, at the second bitrate, to the computing device, a segment of the plurality of second segments and a subsequent segment of the plurality of first segments in the sequence.

Figure 6:
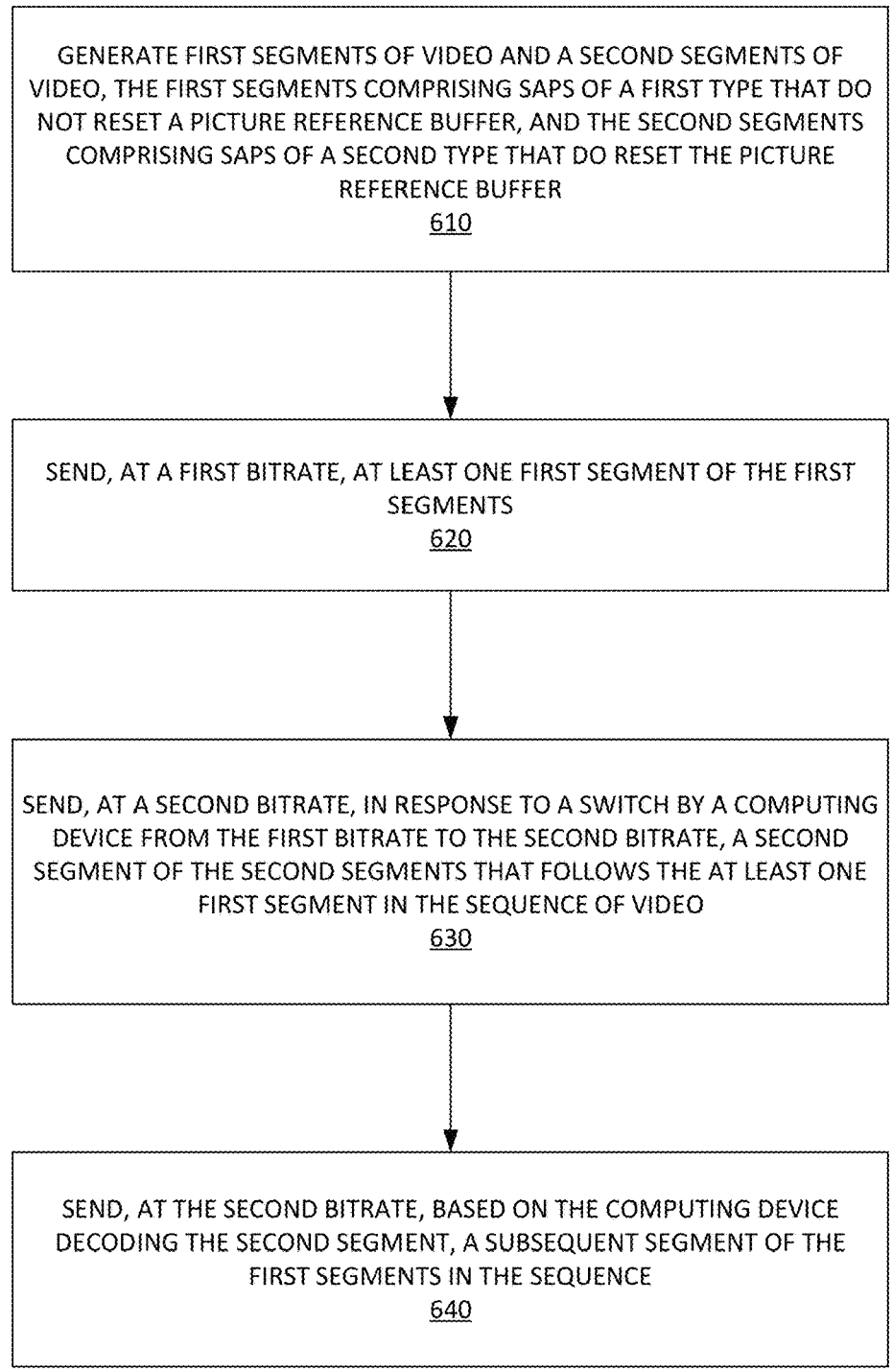
FIG. 6 shows an example method.

FIG. 6 shows an example method 600. The method 600 of FIG. 6, may be performed by the encoder 104 or computing device 110 of FIG. 1. The method 600 of FIG. 6, may be performed by the ABR encoder/transcoder packager 401 of FIG. 4. While each step in the method 600 of FIG. 6 is shown and described separately, multiple steps may be executed in a different order than what is shown, in parallel with each other, or concurrently with each other.

At step 610, the encoder may determine, for a sequence of video frames, a plurality of first segments and a plurality of second segments, wherein the plurality of first segments comprise SAPs of a first type that do not reset a picture reference buffer, and wherein the plurality of second segments comprise SAPs of a second type that do reset the picture reference buffer. The first type may comprise an I-frame, and the second type may comprise an IDR frame as shown in the examples of FIGS. 3-4.

Each first segment of the plurality of first segments may comprise an I-frame, one or more P-frames, and one or more B-frames as shown in the examples of FIGS. 3-4. Each segment of the plurality of second segments may comprise a subset of those frames but still comprise source frame data that matches source frame data in a first segment of the plurality of first segments so that the computing device streaming the content may view the same content whether decoding a first segment or its corresponding second segment.

At step 620, the encoder may send, at a first bitrate, via a content delivery network and to a computing device, at least one segment of the plurality of first segments. At step 630, the encoder may send, at a second bitrate, via the content delivery network to the computing device and in response to a switch by the computing device from the first bitrate to the second bitrate, a segment of the plurality of second segments, wherein the second segment follows the at least one first segment in the sequence. The switch may be based on at least one of: changing network bandwidth, a channel change by the computing device, or a time shifting command by the computing device. The switch may be enabled by detection by the computing device of an indication in the bitstream that a stream at another bitrate is available. At step 640, the encoder may send, at the second bitrate, via the content delivery network to the computing device and based on the computing device decoding the second segment, a subsequent segment of the plurality of first segments in the sequence.

Figure 7:
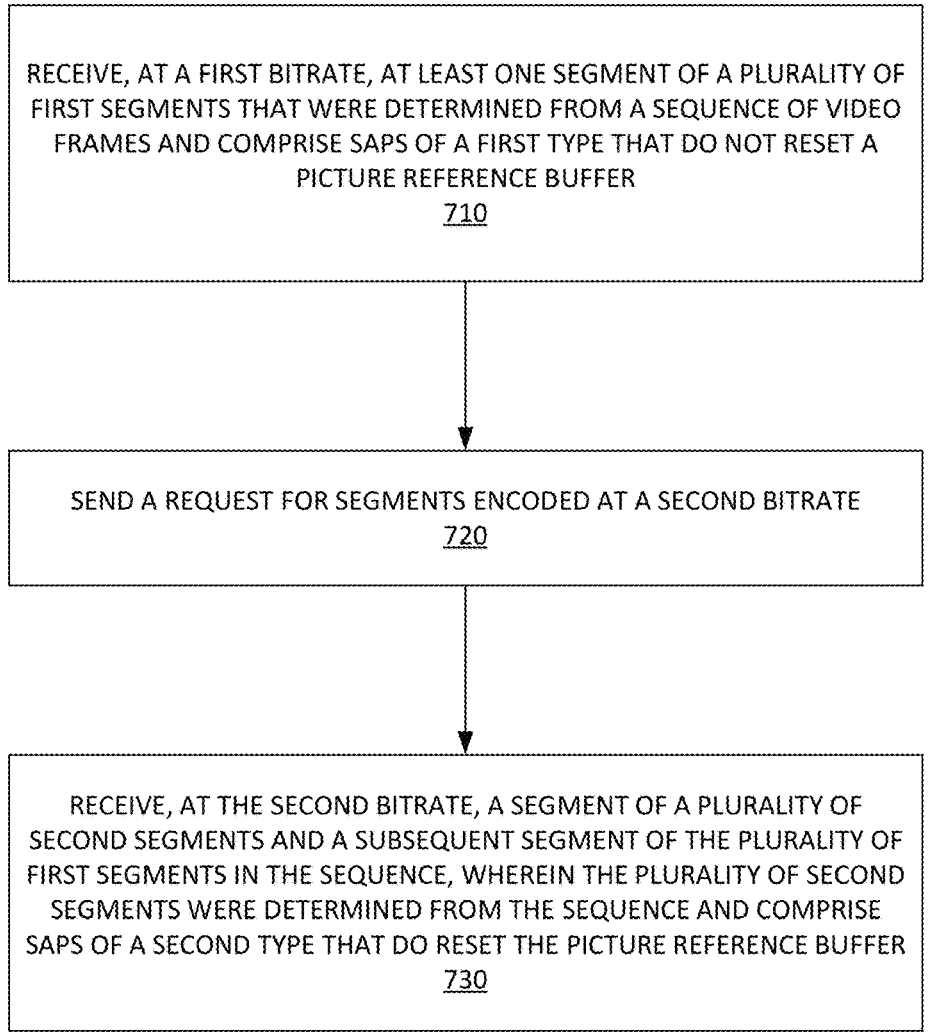
FIG. 7 shows an example method.

FIG. 7 shows an example method 700. The method 700 of FIG. 7, may be performed by the encoder 104 or computing device 110 of FIG. 1. The method 700 of FIG. 7, may be performed by the ABR encoder/transcoder packager 401 of FIG. 4. While each step in the method 700 of FIG. 7 is shown and described separately, multiple steps may be executed in a different order than what is shown, in parallel with each other, or concurrently with each other.

At step 710, the computing device may receive, at a first bitrate, at least one segment of a plurality of first segments, wherein the plurality of first segments were determined from a sequence of video frames and comprise SAPs of a first type that do not reset a picture reference buffer. The first type may comprise an I-frame as shown in the examples of FIGS. 3-4. Each first segment of the plurality of first segments may comprise an I-frame, one or more P-frames, and one or more B-frames as shown in the examples of FIGS. 3-4.

At step 720, the computing device may send a request for segments encoded at a second bitrate. The request may be based on at least one of: changing network bandwidth, a channel change by the computing device, or a time shifting command by the computing device. The request may be enabled by detection by the computing device of an indication in the bitstream that a stream at another bitrate is available. At step 730, the computing device may receive, at the second bitrate, a segment of a plurality of second segments and a subsequent segment of the plurality of first segments in the sequence, wherein the plurality of second segments were determined from the sequence and comprise SAPs of a second type that do reset the picture reference buffer. Each segment of the plurality of second segments may comprise a subset of those frames but still comprise source frame data that matches source frame data in a first segment of the plurality of first segments so that the computing device may view the same content whether decoding a first segment or its corresponding second segment. The second type may comprise an IDR frame as shown in the examples of FIGS. 3-4.

Figure 8:
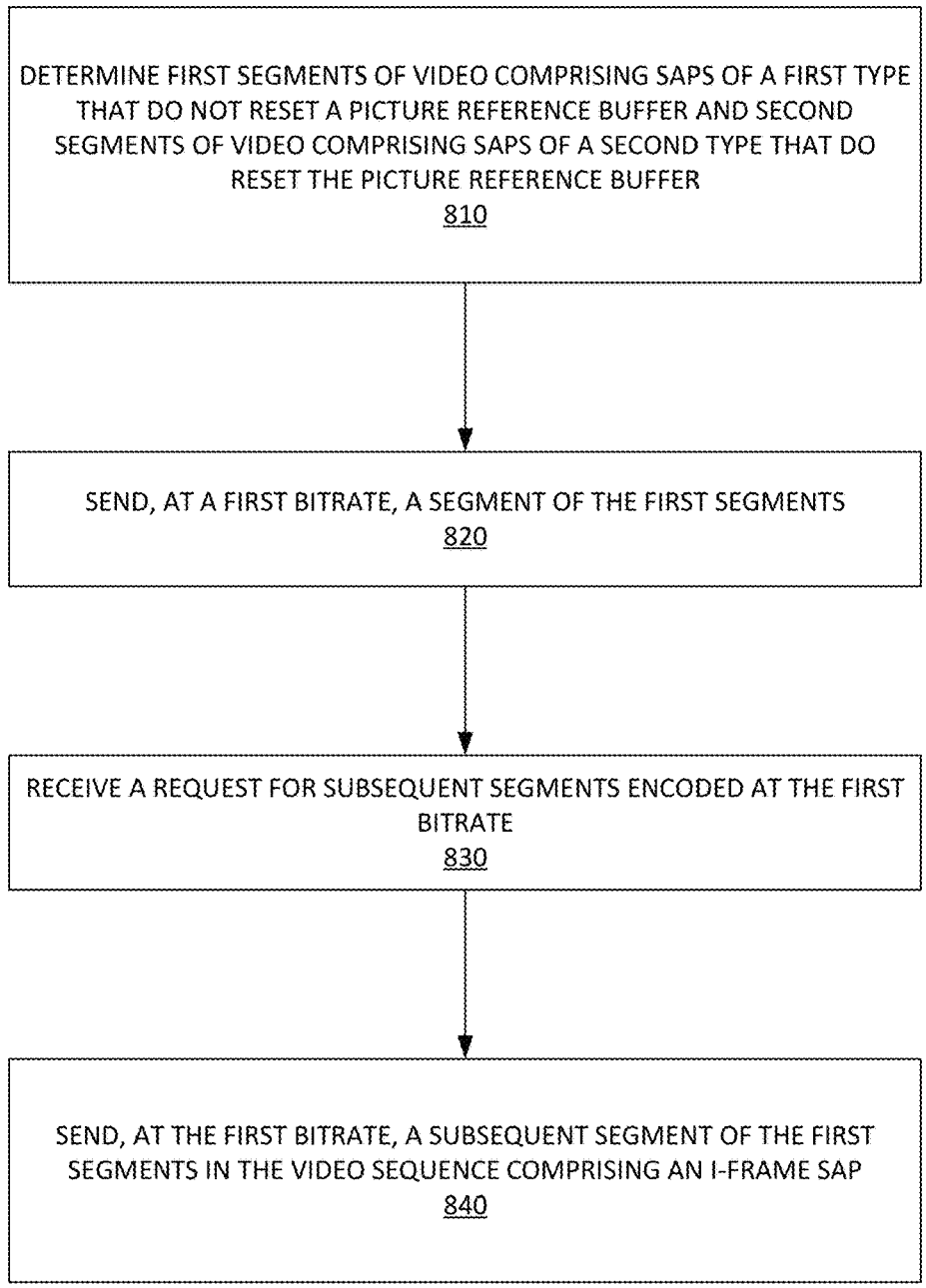
FIG. 8 shows an example method.

FIG. 8 shows an example method 800. The method 800 of FIG. 8, may be performed by the encoder 104 or computing device 110 of FIG. 1. The method 800 of FIG. 8, may be performed by the ABR encoder/transcoder packager 401 of FIG. 4. While each step in the method 800 of FIG. 8 is shown and described separately, multiple steps may be executed in a different order than what is shown, in parallel with each other, or concurrently with each other.

At step 810, the encoder may determine, for a sequence of video frames, a plurality of first segments and a plurality of second segments, wherein the plurality of first segments comprise SAPs of a first type that do not reset a picture reference buffer, and wherein the plurality of second segments comprise SAPs of a second type that do reset the picture reference buffer. The first type may comprise an I-frame, and the second type may comprise an IDR frame as shown in the examples of FIGS. 3-4.

Each segment of the plurality of first segments may comprise an I-frame, one or more P-frames, and one or more B-frames as shown in the examples of FIGS. 3-4. Each segment of the plurality of second segments may comprise a subset of those frames but still comprise source frame data that matches source frame data in a first segment of the plurality of first segments so that the computing device streaming the content may view the same content whether decoding a first segment or its corresponding second segment.

At step 820, the encoder may send, at a first bitrate, to a computing device, a segment of the plurality of first segments. At step 830, the encoder may receive, from the computing device, a request for subsequent segments encoded at the first bitrate. The request may be based on steady network bandwidth or other steady network conditions. At step 840, the encoder may send, at the first bitrate, to the computing device, a subsequent segment of the plurality of first segments in the sequence, wherein an SAP of the subsequent segment comprises an I-frame.

Figure 9:
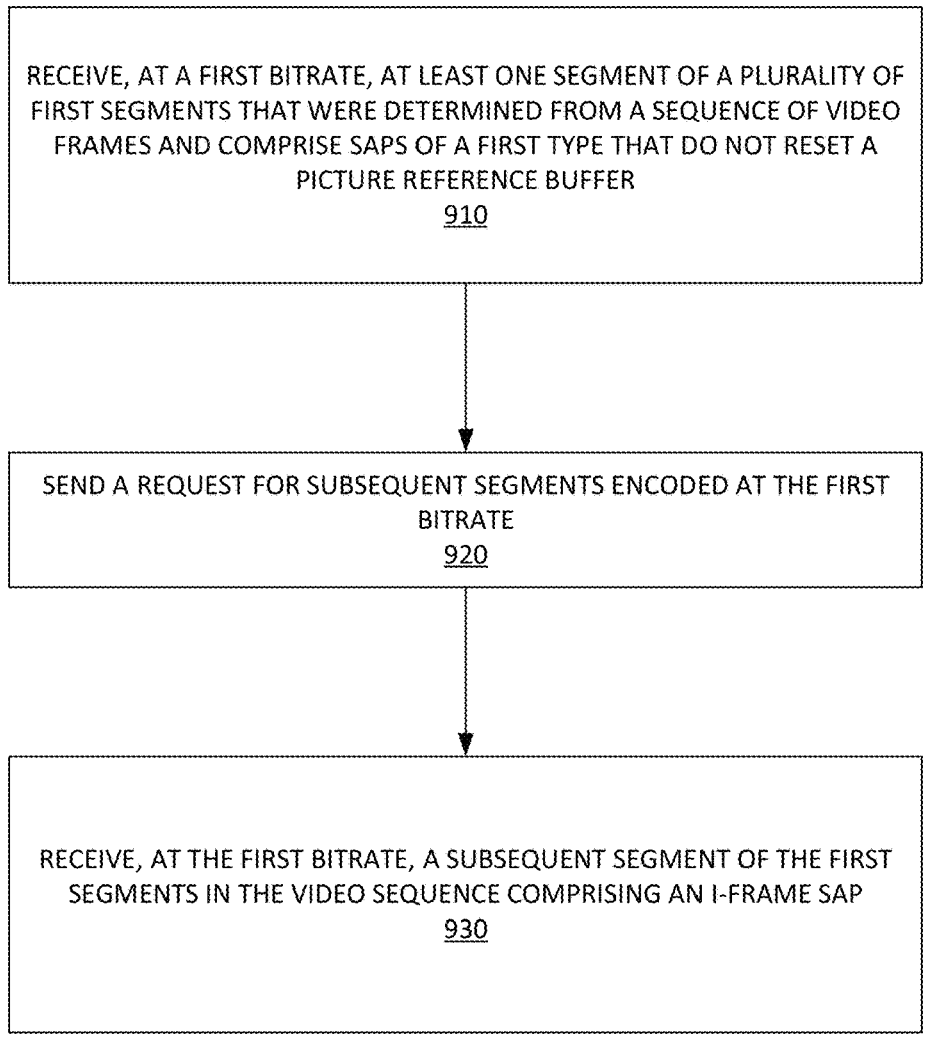
FIG. 9 shows an example method.

FIG. 9 shows an example method 900. The method 900 of FIG. 9, may be performed by the encoder 104 or computing device 110 of FIG. 1. The method 900 of FIG. 9, may be performed by the ABR encoder/transcoder packager 401 of FIG. 4. While each step in the method 900 of FIG. 9 is shown and described separately, multiple steps may be executed in a different order than what is shown, in parallel with each other, or concurrently with each other.

At step 910, the computing device may receive, at a first bitrate, at least one segment of a plurality of first segments, wherein the plurality of first segments were determined from a sequence of video frames and comprise SAPs of a first type that do not reset a picture reference buffer. The first type may comprise an I-frame as shown in the examples of FIGS. 3-4. Each first segment of the plurality of first segments may comprise an I-frame, one or more P-frames, and one or more B-frames as shown in the examples of FIGS. 3-4. A plurality of second segments may also be determined from the sequence and comprise SAPs of a second type that do reset the picture reference buffer. Each segment of the plurality of second segments may comprise a subset of those frames but still comprise source frame data that matches source frame data in a first segment of the plurality of first segments so that the computing device may view the same content whether decoding a first segment or its corresponding second segment. The second type may comprise an IDR frame as shown in the examples of FIGS. 3-4.

At step 920, the computing device may send a request for subsequent segments encoded at the first bitrate. The request may be based on steady network bandwidth or other steady network conditions. At step 930, the computing device may receive, at the first bitrate, a subsequent segment of the plurality of first segments in the sequence, wherein an SAP of the subsequent segment comprises an I-frame.

Figure 10:
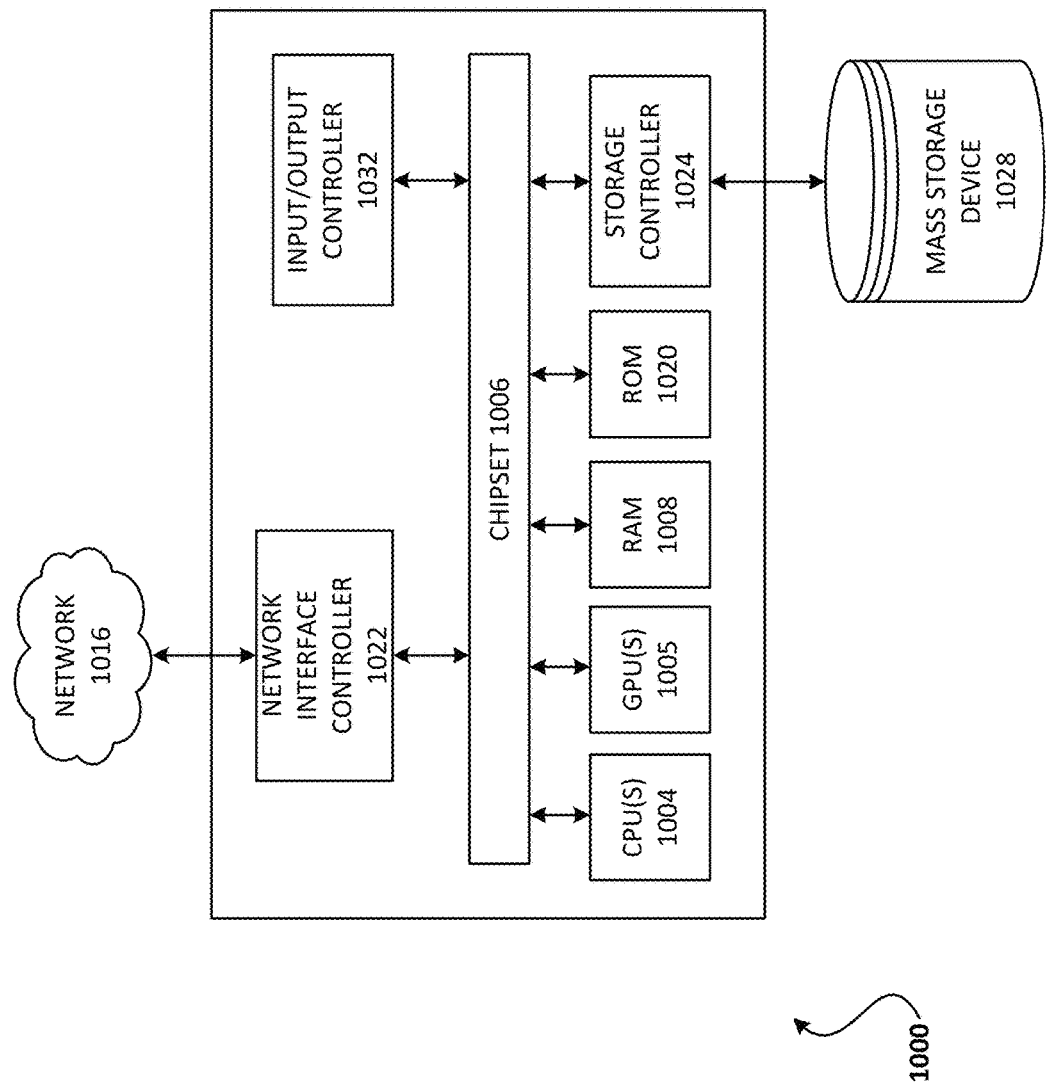
FIG. 10 shows an example computing device.

FIG. 10 depicts a computing device 1000 that may be used in various aspects, such as the servers, modules, and/or devices depicted in FIGS. 1-4. With regard to the example architectures of FIGS. 1-4, the devices may each be implemented in an instance of a computing device 1000 of FIG. 10. The computer architecture shown in FIG. 10 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 5-9.

The computing device 1000 may include a baseboard, or "motherboard," which is a printed circuit board to which a multitude of components or devices may be connected by way of a system bus or other electrical communication paths. One or more central processing units (CPUs) 1004 may operate in conjunction with a chipset 1006. The CPU(s) 1004 may be standard programmable processors that perform arithmetic and logical operations necessary for the operation of the computing device 1000.

The CPU(s) 1004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1004 may be augmented with or replaced by other processing units, such as GPU(s) 1005. The GPU(s) 1005 may comprise processing units specialized for but not necessarily limited to highly parallel computations, such as graphics and other visualization-related processing.

A chipset 1006 may provide an interface between the CPU(s) 1004 and the remainder of the components and devices on the baseboard. The chipset 1006 may provide an interface to a random access memory (RAM) 1008 used as the main memory in the computing device 1000. The chipset 1006 may further provide an interface to a computer-readable storage medium, such as a read-only memory (ROM) 1020 or non-volatile RAM (NVRAM) (not shown), for storing basic routines that may help to start up the computing device 1000 and to transfer information between the various components and devices. ROM 1020 or NVRAM may also store other software components necessary for the operation of the computing device 1000 in accordance with the aspects described herein.

The computing device 1000 may operate in a networked environment using logical connections to remote computing nodes and computer systems through local area network (LAN) 1016. The chipset 1006 may include functionality for providing network connectivity through a network interface controller (NIC) 1022, such as a gigabit Ethernet adapter. A NIC 1022 may be capable of connecting the computing device 1000 to other computing nodes over a network 1016. It should be appreciated that multiple NICs 1022 may be present in the computing device 1000, connecting the computing device to other types of networks and remote computer systems.

The computing device 1000 may be connected to a mass storage device 1028 that provides non-volatile storage for the computer. The mass storage device 1028 may store system programs, application programs, other program modules, and data, which have been described in greater detail herein. The mass storage device 1028 may be connected to the computing device 1000 through a storage controller 1024 connected to the chipset 1006. The mass storage device 1028 may consist of one or more physical storage units. A storage controller 1024 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1000 may store data on a mass storage device 1028 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1028 is characterized as primary or secondary storage and the like.

For example, the computing device 1000 may store information to the mass storage device 1028 by issuing instructions through a storage controller 1024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1000 may further read information from the mass storage device 1028 by detecting the physical states or characteristics of one or more particular locations within the physical storage units.

In addition to the mass storage device 1028 described herein, the computing device 1000 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1000.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1028 depicted in FIG. 10, may store an operating system utilized to control the operation of the computing device 1000. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1028 may store other system or application programs and data utilized by the computing device 1000.

The mass storage device 1028 or other computer-readable storage media may also be encoded with computer-executable instructions, which, when loaded into the computing device 1000, transforms the computing device from a general-purpose computing system into a special-purpose computer capable of implementing the aspects described herein. These computer-executable instructions transform the computing device 1000 by specifying how the CPU(s) 1004 transition between states, as described herein. The computing device 1000 may have access to computer-readable storage media storing computer-executable instructions, which, when executed by the computing device 1000, may perform the methods described in relation to FIG. 5.

A computing device, such as the computing device 1000 depicted in FIG. 10, may also include an input/output controller 1032 for receiving and processing input from a number of input devices, such as a keyboard, a mouse, a touchpad, a touch screen, an electronic stylus, or other type of input device. Similarly, an input/output controller 1032 may provide output to a display, such as a computer monitor, a flat-panel display, a digital projector, a printer, a plotter, or other type of output device. It will be appreciated that the computing device 1000 may not include all of the components shown in FIG. 10, may include other components that are not explicitly shown in FIG. 10, or may utilize an architecture completely different than that shown in FIG. 10.

As described herein, a computing device may be a physical computing device, such as the computing device 1000 of FIG. 10. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. An apparatus comprising:
   one or more processors; and
   memory storing instructions that, when executed by the one or more processors, cause the device to:
   receive, at a first bitrate, at least one segment of a first variant, wherein the at least one segment of the first variant comprises stream access points (SAPs) of a first type that do not reset a picture reference buffer;
   send a request for segments encoded at a second bitrate; and
   receive, at the second bitrate, a segment, of a second variant, that comprises a SAP of a second type that does reset the picture reference buffer, and a next segment of the second variant comprising a SAP of the first type.

2. The apparatus of claim 1, wherein the first type comprises an I-frame and the second type comprises an instantaneous decoder refresh (IDR) frame.

3. The apparatus of claim 1, wherein the request is based on at least one of: changing network bandwidth, a channel change by the computing device, or a time shifting command by the computing device.

4. The apparatus of claim 1, wherein each segment, of the first variant, comprising SAPs of the first type comprises source frame data that matches source frame data in a segment comprising SAPs of the second type;
   wherein each segment, of the second variant, comprising SAPs of the first type comprises source frame data that matches source frame data in a segment comprising SAPs of the second type.

5. The apparatus of claim 1, wherein each segment, comprising SAPs of the second type, comprises a subset of frames in a segment comprising SAPs of the first type.

6. The apparatus of claim 1, wherein each segment, comprising SAPs of the first type, comprises an I-frame, one or more P-frames, and one or more B-frames.

7. The apparatus of claim 6, wherein each segment, comprising SAPs of the second type, comprises a subset of the one or more P-frames and the one or more B-frames.

8. The apparatus of claim 1, wherein each segment, comprising SAPs of the second type, comprises:
   an instantaneous decoder refresh (IDR) frame that comprises first B-frame data associated with a first B-frame in a corresponding segment comprising SAPs of the first type,
   a P-frame that comprises I-frame data associated with an I-frame in the corresponding segment comprising SAPs of the first type and that references the IDR frame for forward prediction, and
   a B-frame that comprises second B-frame data associated with a second B-frame in the corresponding segment comprising SAPs of the first type and that references the IDR frame and the P-frame for bidirectional prediction.

9. A non-transitory computer-readable medium storing instructions that, when executed, cause:
   receiving, at a first bitrate, at least one segment of a first variant, wherein the at least one segment of the first variant comprises stream access points (SAPs) of a first type that do not reset a picture reference buffer;
   sending a request for segments encoded at a second bitrate; and receiving, at the second bitrate, a segment, of a second variant, that comprises a SAP of a second type that does reset the picture reference buffer, and a next segment of the second variant comprising a SAP of the first type.

10. The non-transitory computer-readable medium of claim 9, wherein the first type comprises an I-frame and the second type comprises an instantaneous decoder refresh (IDR) frame.

11. The non-transitory computer-readable medium of claim 9, wherein the request is based on at least one of: changing network bandwidth, a channel change by the computing device, or a time shifting command by the computing device.

12. The non-transitory computer-readable medium of claim 9, wherein each segment, of the first variant, comprising SAPs of the first type comprises source frame data that matches source frame data in a segment comprising SAPs of the second type;
wherein each segment, of the second variant, comprising SAPs of the first type comprises source frame data that matches source frame data in a segment comprising SAPs of the second type.

13. The non-transitory computer-readable medium of claim 9, wherein each segment, comprising SAPs of the second type, comprises a subset of frames in a segment comprising SAPs of the first type.

14. The non-transitory computer-readable medium of claim 9, wherein each segment, comprising SAPs of the first type, comprises an I-frame, one or more P-frames, and one or more B-frames.

15. The non-transitory computer-readable medium of claim 14, wherein each segment, comprising SAPs of the second type, comprises a subset of the one or more P-frames and the one or more B-frames.

16. The non-transitory computer-readable medium of claim 9, wherein each segment, comprising SAPs of the second type, comprises:
an instantaneous decoder refresh (IDR) frame that comprises first B-frame data associated with a first B-frame in a corresponding segment comprising SAPs of the first type,
a P-frame that comprises I-frame data associated with an I-frame in the corresponding segment comprising SAPs of the first type and that references the IDR frame for forward prediction, and
a B-frame that comprises second B-frame data associated with a second B-frame in the corresponding segment comprising SAPs of the first type and that references the IDR frame and the P-frame for bidirectional prediction.

17. A system comprising:
a first computing device configured to:
receive, at a first bitrate, at least one segment of a first variant, wherein the at least one segment of the first variant comprises stream access points (SAPs) of a first type that do not reset a picture reference buffer,
send a request for segments encoded at a second bitrate, and
receive, at the second bitrate, a segment, of a second variant, that comprises a SAP of a second type that does reset the picture reference buffer, and a next segment of the second variant comprising a SAP of the first type; and
a second computing device configured to:
send the at least one segment of a first variant, and
send the segment, of the second variant, that comprises the SAP of the second type and the next segment of the second variant.

18. The system of claim 17, wherein the first type comprises an I-frame and the second type comprises an instantaneous decoder refresh (IDR) frame.

19. The system of claim 17, wherein the request is based on at least one of: changing network bandwidth, a channel change by the computing device, or a time shifting command by the computing device.

20. The system of claim 17, wherein each segment, of the first variant, comprising SAPs of the first type comprises source frame data that matches source frame data in a segment comprising SAPs of the second type;
wherein each segment, of the second variant, comprising SAPs of the first type comprises source frame data that matches source frame data in a segment comprising SAPs of the second type.

21. The system of claim 17, wherein each segment, comprising SAPs of the second type, comprises a subset of frames in a segment comprising SAPs of the first type.

22. The system of claim 17, wherein each segment, comprising SAPs of the first type, comprises an I-frame, one or more P-frames, and one or more B-frames.

23. The system of claim 22, wherein each segment, comprising SAPs of the second type, comprises a subset of the one or more P-frames and the one or more B-frames.

24. The system of claim 17, wherein each segment, comprising SAPs of the second type, comprises:
an instantaneous decoder refresh (IDR) frame that comprises first B-frame data associated with a first B-frame in a corresponding segment comprising SAPs of the first type,
a P-frame that comprises I-frame data associated with an I-frame in the corresponding segment comprising SAPs of the first type and that references the IDR frame for forward prediction, and
a B-frame that comprises second B-frame data associated with a second B-frame in the corresponding segment comprising SAPs of the first type and that references the IDR frame and the P-frame for bidirectional prediction.

25. An apparatus comprising:
one or more processors; and
memory storing instructions that, when executed by the one or more processors, cause the device to:
send, at a first bitrate, to a computing device, at least one segment of a first variant, wherein the at least one segment of the first variant comprises stream access points (SAPs) of a first type that do not reset a picture reference buffer;
receive, from the computing device, a request for segments encoded at a second bitrate; and
send, at the second bitrate, to the computing device, a segment of a second variant comprising a SAP of a second type that does reset the picture reference buffer and a next segment of the second variant comprising a SAP of the first type.

26. The apparatus of claim 25, wherein the request is based on at least one of: changing network bandwidth, a channel change by the computing device, or a time shifting command by the computing device.

27. The apparatus of claim 25, wherein each segment, of the first variant, comprises SAPs of the first type and comprises source frame data that matches source frame data in a segment comprising SAPs of the second type;

wherein each segment, of the second variant, comprising SAPs of the first type comprises source frame data that matches source frame data in a segment comprising SAPs of the second type.

28. The apparatus of claim 25, wherein each segment, comprising SAPs of the second type, comprises:
an instantaneous decoder refresh (IDR) frame that comprises first B-frame data associated with a first B-frame in a corresponding segment comprising SAPs of the first type,
a P-frame that comprises I-frame data associated with an I-frame in the corresponding segment comprising SAPs of the first type and that references the IDR frame for forward prediction, and
a B-frame that comprises second B-frame data associated with a second B-frame in the corresponding segment comprising SAPs of the first type and that references the IDR frame and the P-frame for bidirectional prediction.

29. A non-transitory computer-readable medium storing instructions that, when executed, cause:
sending, at a first bitrate, to a computing device, at least one segment of a first variant, wherein the at least one segment of the first variant comprises stream access points (SAPs) of a first type that do not reset a picture reference buffer;
receiving, from the computing device, a request for segments encoded at a second bitrate; and
sending, at the second bitrate, to the computing device, a segment of a second variant comprising a SAP of a second type that does reset the picture reference buffer and a next segment of the second variant comprising a SAP of the first type.

30. The non-transitory computer-readable medium of claim 29, wherein the request is based on at least one of: changing network bandwidth, a channel change by the computing device, or a time shifting command by the computing device.

31. The non-transitory computer-readable medium of claim 29, wherein each segment, of the first variant, comprises SAPs of the first type and comprises source frame data that matches source frame data in a segment comprising SAPs of the second type;
wherein each segment, of the second variant, comprising SAPs of the first type comprises source frame data that matches source frame data in a segment comprising SAPs of the second type.

32. The non-transitory computer-readable medium of claim 29, wherein each segment, comprising SAPs of the second type, comprises:
an instantaneous decoder refresh (IDR) frame that comprises first B-frame data associated with a first B-frame in a corresponding segment comprising SAPs of the first type,
a P-frame that comprises I-frame data associated with an I-frame in the corresponding segment comprising SAPs of the first type and that references the IDR frame for forward prediction, and
a B-frame that comprises second B-frame data associated with a second B-frame in the corresponding segment comprising SAPs of the first type and that references the IDR frame and the P-frame for bidirectional prediction.

33. A system comprising:
a first computing device configured to:
send, at a first bitrate, to a computing device, at least one segment of a first variant, wherein the at least one segment of the first variant comprises stream access points (SAPs) of a first type that do not reset a picture reference buffer,
receive a request for segments encoded at a second bitrate, and
send, at the second bitrate, to the computing device, a segment of a second variant comprising a SAP of a second type that does reset the picture reference buffer and a next segment of the second variant comprising a SAP of the first type; and
a second computing device configured to:
send the request for segments encoded at the second bitrate.

34. The system of claim 33, wherein the request is based on at least one of: changing network bandwidth, a channel change by the computing device, or a time shifting command by the computing device.

35. The system of claim 33, wherein each segment, of the first variant, comprises SAPs of the first type and comprises source frame data that matches source frame data in a segment comprising SAPs of the second type;
wherein each segment, of the second variant, comprising SAPs of the first type comprises source frame data that matches source frame data in a segment comprising SAPs of the second type.

36. The system of claim 33, wherein each segment, comprising SAPs of the second type, comprises:
an instantaneous decoder refresh (IDR) frame that comprises first B-frame data associated with a first B-frame in a corresponding segment comprising SAPs of the first type,
a P-frame that comprises I-frame data associated with an I-frame in the corresponding segment comprising SAPs of the first type and that references the IDR frame for forward prediction, and
a B-frame that comprises second B-frame data associated with a second B-frame in the corresponding segment comprising SAPs of the first type and that references the IDR frame and the P-frame for bidirectional prediction.

* * * * *